J. W. HOWE.
TAG MACHINE.
APPLICATION FILED DEC. 27, 1910.
1,005,548.
Patented Oct. 10, 1911.
7 SHEETS—SHEET 7.
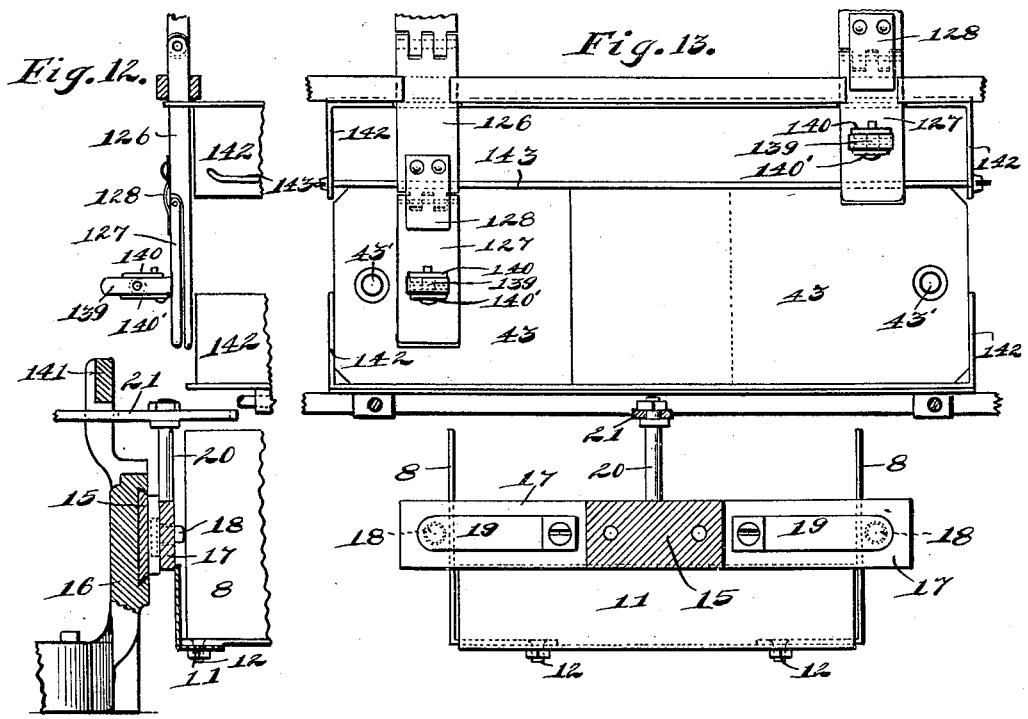
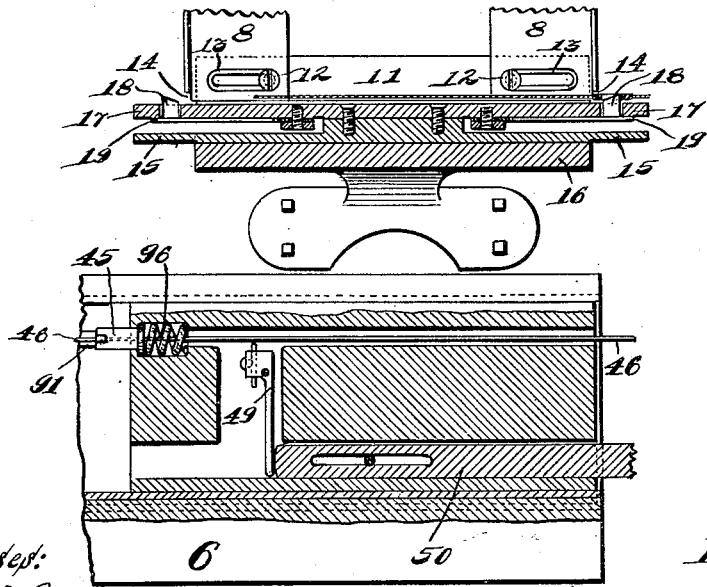
Witnesses:
C. E. Wessels.
B. G. Richards.
Inventor:
John W. Howe,
By Joshua R. H. Potts
his Attorney.

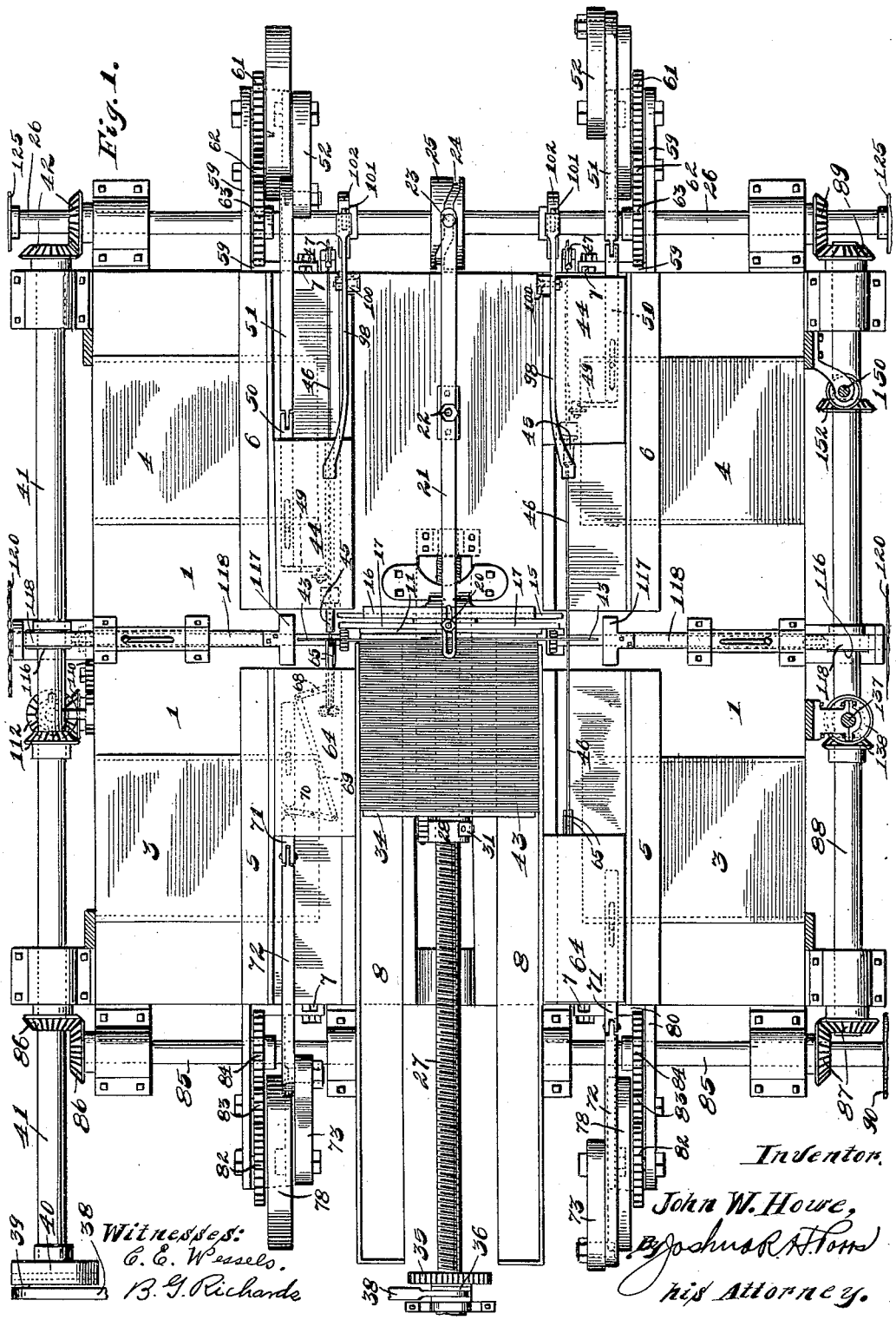

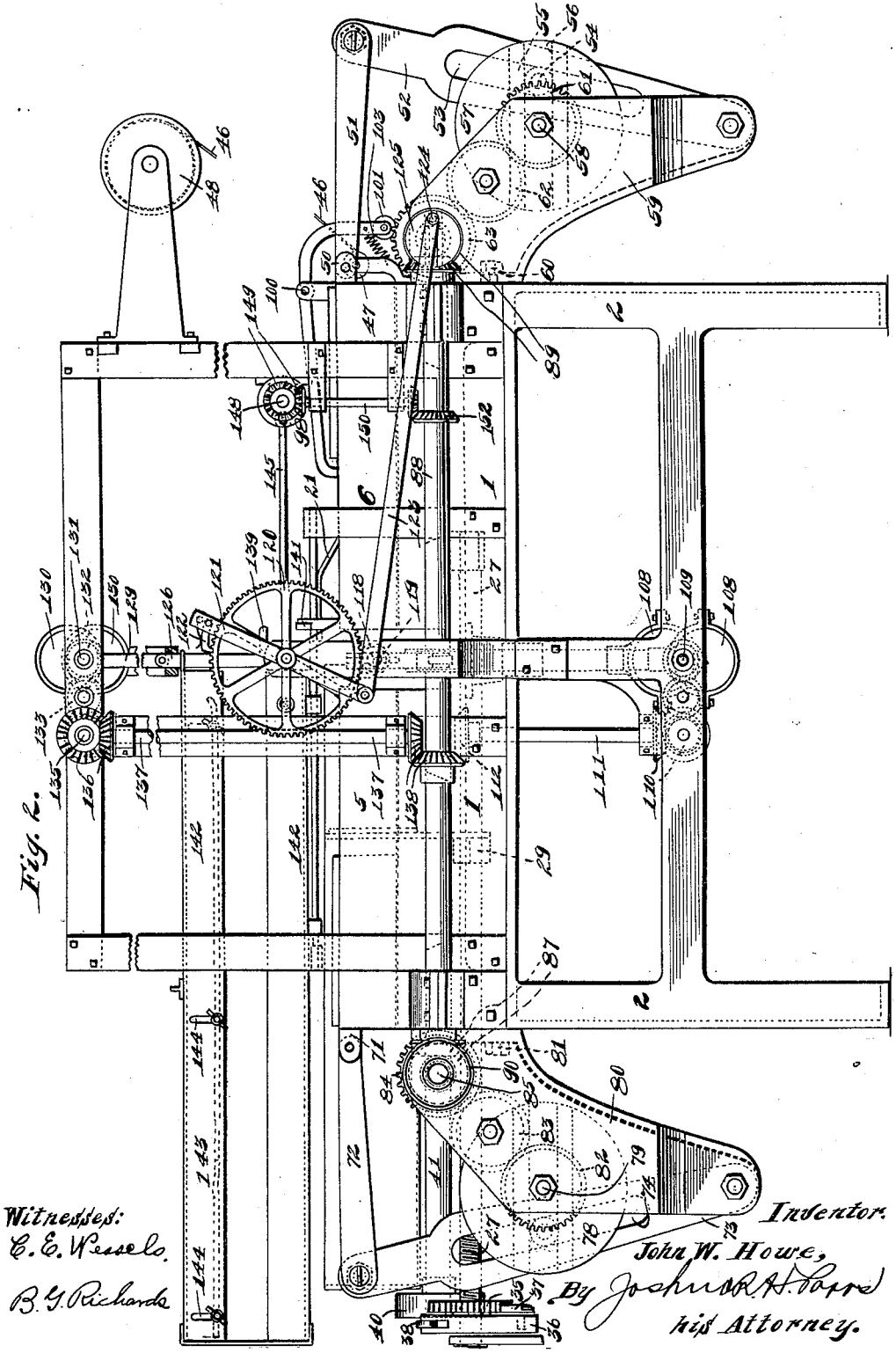

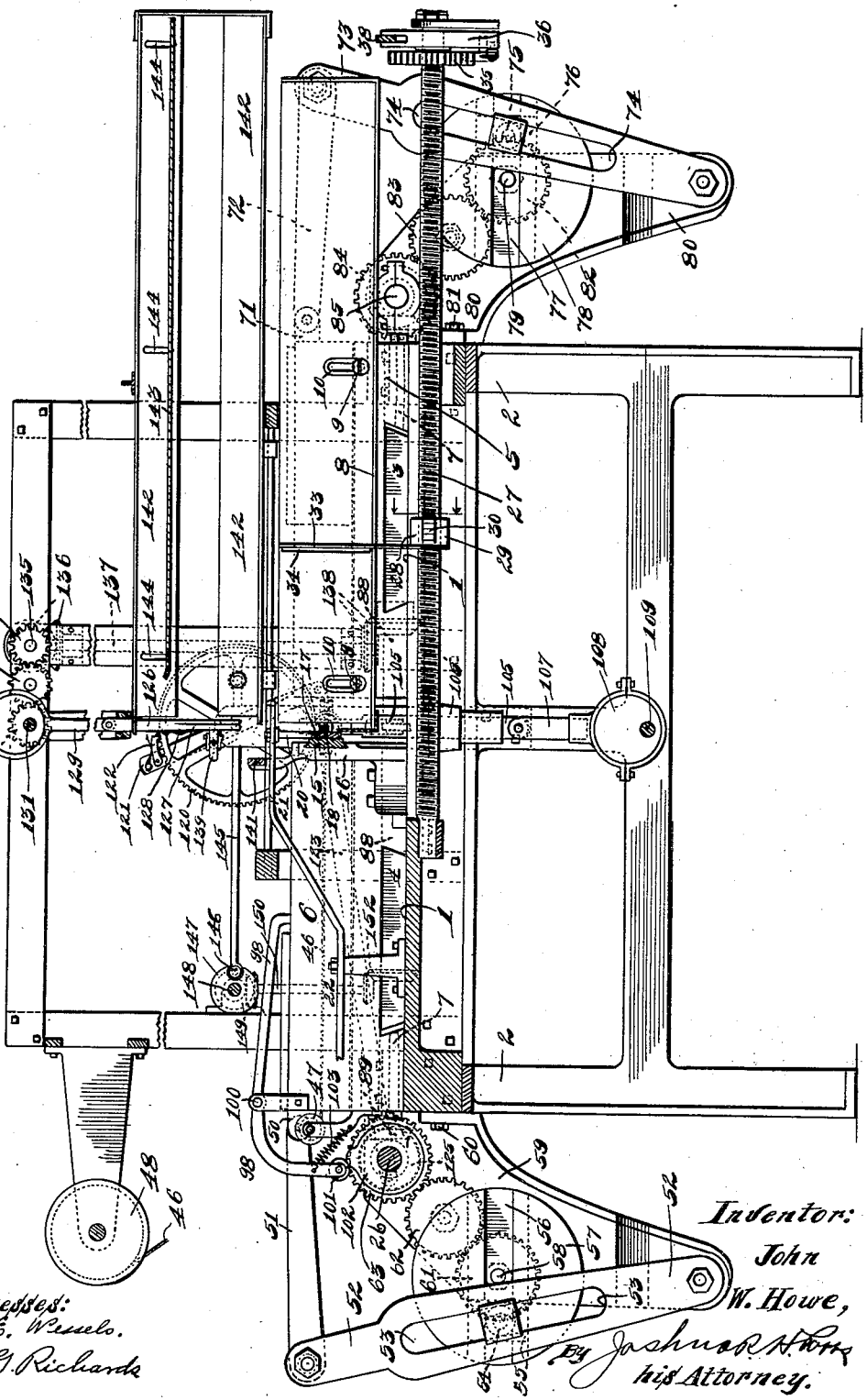

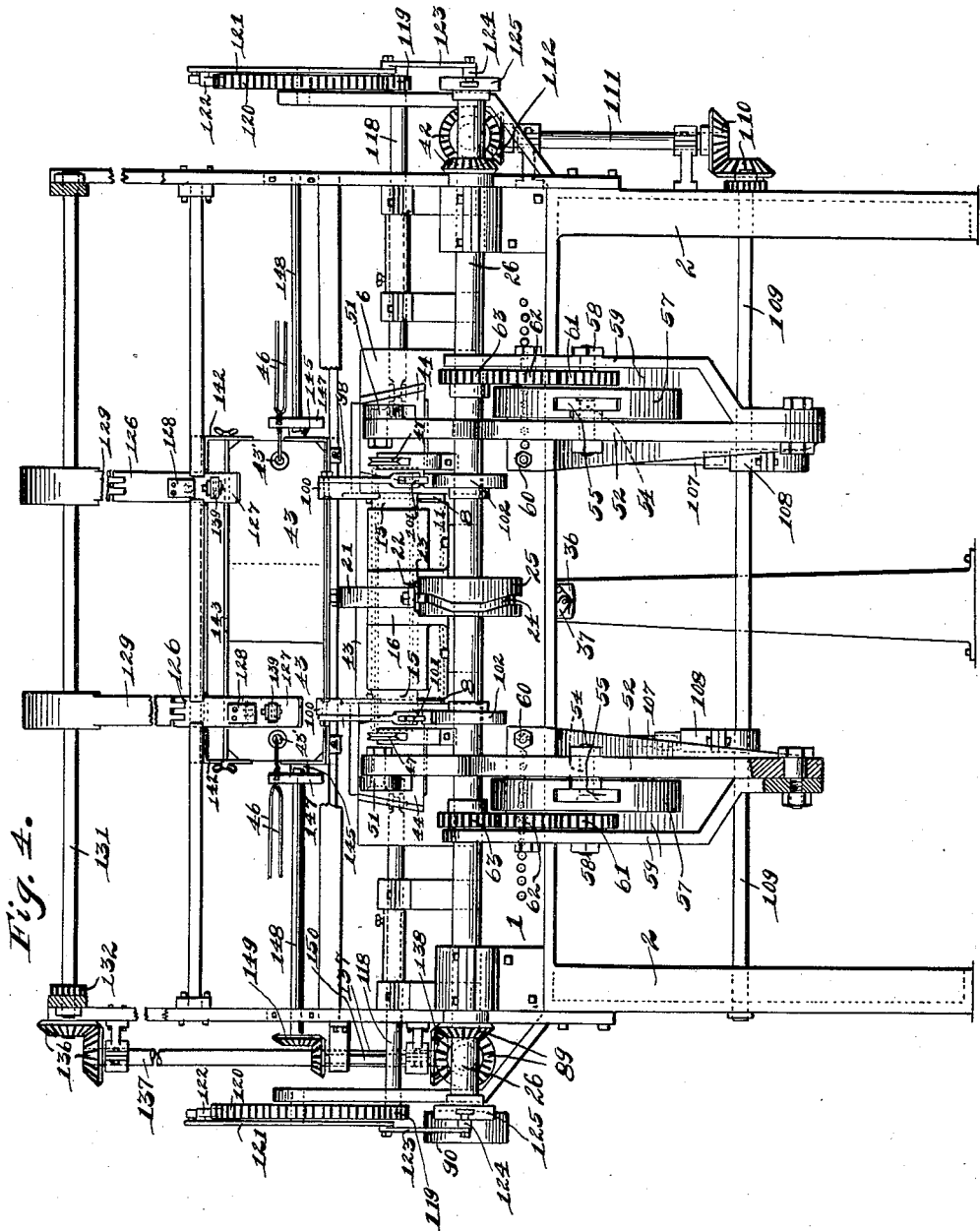

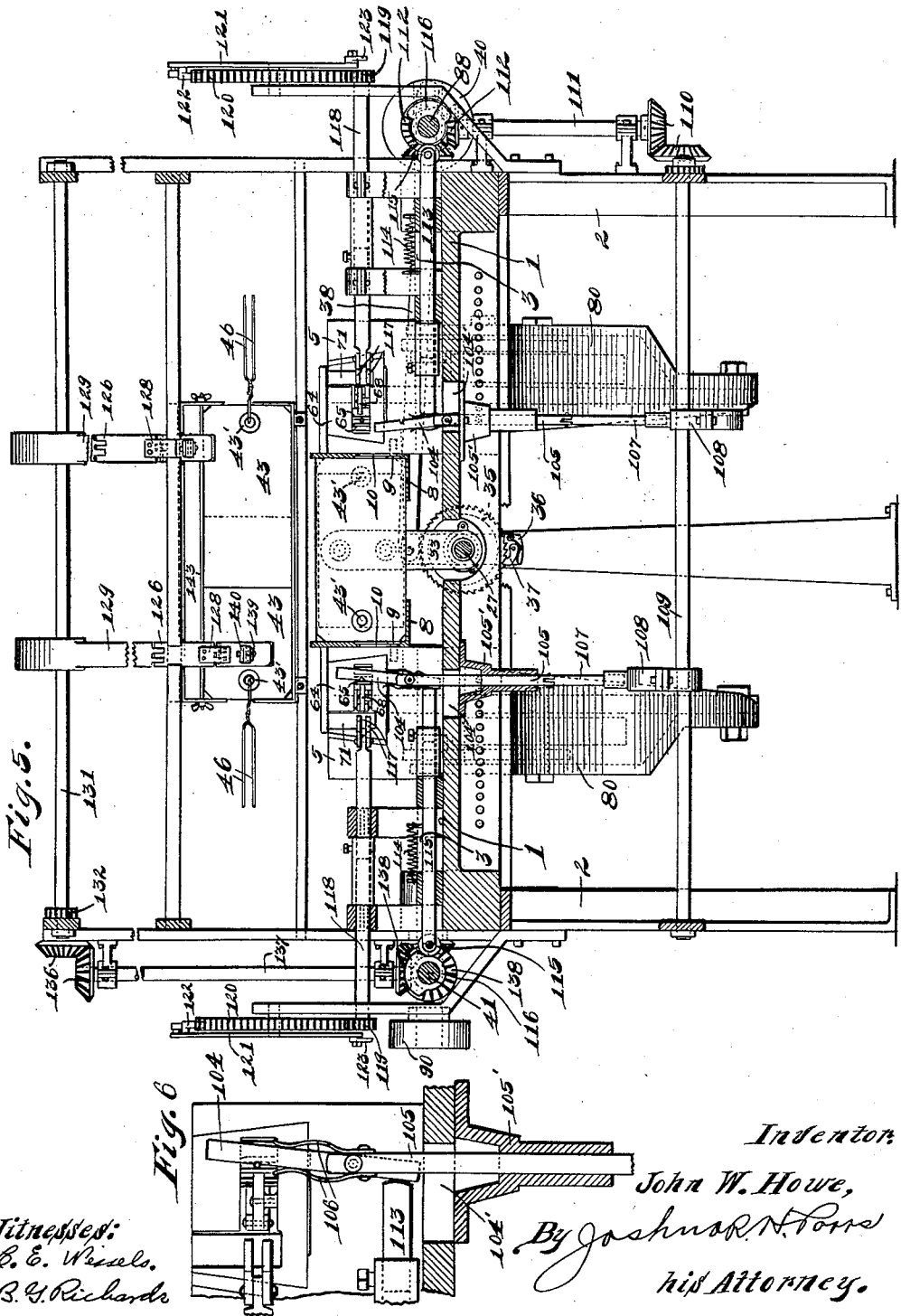

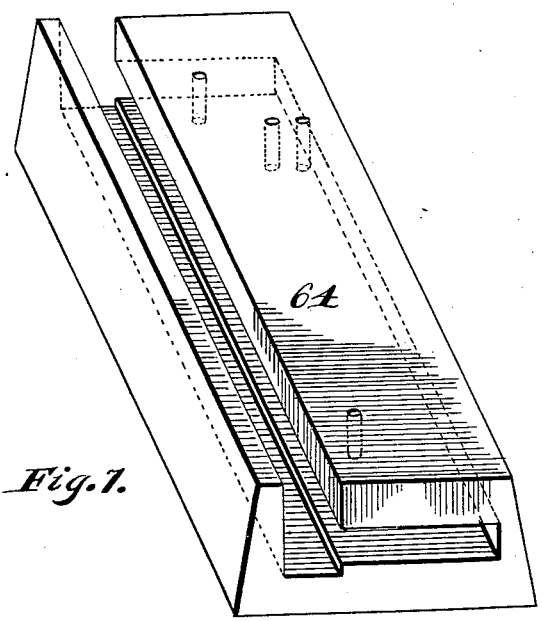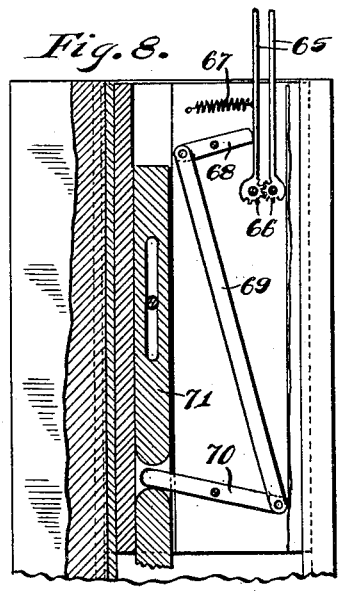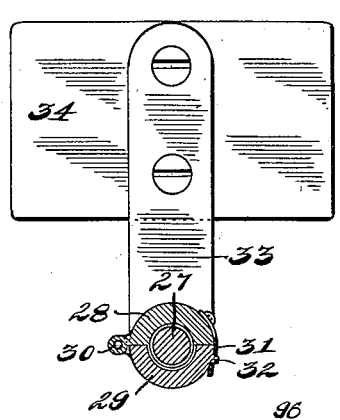

UNITED STATES PATENT OFFICE.

JOHN W. HOWE, OF FOREST PARK, ILLINOIS, ASSIGNOR OF ONE-HALF TO ANTHONY HLARAC, OF CHICAGO, ILLINOIS.

TAG-MACHINE.

1,005,548.          Specification of Letters Patent.      Patented Oct. 10, 1911.

Application filed December 27, 1910. Serial No. 599,509.

*To all whom it may concern:*

Be it known that I, JOHN W. HOWE, a citizen of the United States, and a resident of the city of Forest Park, county of Cook, and State of Illinois, have invented certain new and useful Improvements in Tag-Machines, of which the following is a specification.

My invention relates to improvements in tag machines designed to automatically fasten the wires or other securing means through the eyes of the tags.

The object of the invention is an improved machine of this character which shall be of simple construction and efficient in operation.

The invention consists in the combination and arrangements of parts hereinafter described and claimed.

The invention will be best understood by reference to the accompanying drawings forming a part of this specification and in which—

Figure 1 is a top plan view of a machine embodying my invention with parts removed and broken away, Fig. 2, a side elevation of the machine, Fig. 3, a longitudinal central section of the machine, Fig. 4, a front elevation of the machine, Fig. 5, a transverse section of the machine, Fig. 6, an enlarged detail view showing the bifurcated finger employed in bending the ends of the securing wires together, Fig. 7, a perspective view of the wire receiving slide employed in the machine, Fig. 8, a horizontal section illustrating the wire clutching mechanism in the wire receiving slide, Fig. 9, an enlarged detail view showing the split nut employed for operating the pressure plate employed in feeding the tags to the wiring mechanism, Fig. 10, an enlarged detail view illustrating the means for severing the wire employed, Fig. 11, another enlarged detail view illustrating the construction for placing the wire cutting table in operative or inoperative positions, Fig. 12, an enlarged detail showing the jaw for entirely removing the tags from the feed receptacle, Fig. 13 is a front elevation of the same corresponding to Fig. 12, Fig. 14, a horizontal section illustrating the slide and legs employed for partially withdrawing the tags from the feed receptacle, and Fig. 15 is a horizontal section illustrating the clutch and mechanism in the wire delivery slide.

The preferred form of construction as illustrated in the drawings comprises a suitable frame consisting of a table 1 and suitable supporting standards 2. Arranged on table 1 near each end thereof are laterally extending dove tail guides 3—3 and 4—4 as shown. Guide blocks 5—5 are mounted to be laterally adjustable on guides 3—3 and guide blocks 6—6 are mounted to be laterally adjustable on guides 4—4, binding screws 7 being provided for securing said blocks in lateral adjusted positions. A tag for the receptacle is formed by angle irons 8 secured to the adjacent faces of blocks 5—5 by means of counter-sunk screws 9 taking through vertical slots 10 in the vertical legs of said angle irons, thus rendering said feed receptacle adjustable in both depth and width. At their forward or discharge ends, the horizontal legs of angle-irons 8 are connected by means of a strip or plate 11 secured to said legs by means of counter-sunk screws 12 taking through slots 13 as shown in Fig. 14. The ends of the vertical legs of angle irons 8 are cut away to provide lateral discharge openings 14 at each side of the discharge end of the receptacle. A lateral and horizontal reciprocating slide 15 is dove-tailed in a standard 16 which is located centrally at the discharge end of the feed receptacle. Slide 15 carries a removable bar 17, through the perforated end of which bevel dogs 18 project, the said dogs being yieldingly held in protruding positions by means of springs 19 carrying said dogs and secured to the outer face of bar 17 as indicated in Fig. 14. Bar 17 also carries an upwardly extending centrally arranged pin or post 20 having a slotted connection with the rear end of a lever 21 fulcrumed on a standard 22 and carrying a pin 23 at its forward end set to travel in the cam slot 24 in the cam 25 which is mounted upon the shaft 26 mounted across the front of table 1 as indicated in Fig. 1. The cam slot 24 is formed as shown to cause lever 21 to swing to its limit of movement then pause momentarily, swing back to central position, pause at the central position momentarily, then swing to the other side of its central position to the end of its movement, pause momentarily in the last mentioned position, then swing back to central position with a momentary pause at central position, when the above mentioned cycle of operation is repeated.

Table 1 is centrally and longitudinally slotted at its rear portion and a feed screw 27 is rotatably mounted below said slot. A split nut is mounted upon feed screw 27, the said nut comprising an outer threaded portion 28 and a lower end threaded portion 29 pivoted together at 30 and temporarily locked in closed position by means of a spring catch 31 secured to portion 28 and engaging a lug 32 on portion 29. By this arrangement it will be observed that by releasing catch 31 the nut may be readily adjusted on screw 27 without turning the latter. Said nut carries an upwardly extending arm or post 33 to the upper end of which is attached a pressure plate 34 operating between angle irons 8 and serving as a means for feeding tags in the feed receptacle toward its discharge end. At its rear end feed screw 27 carries a ratchet wheel 35 and an oscillatory arm 36 carrying a pawl 37 operating on said ratchet wheel. The arm 36 is connected by means of a link 38 with an adjustable crank pin 39 carried by the face plate 40 on the end of a shaft 41 rotatably mounted at the side of table 1 and having a beveled gear connection 42 with the shaft 26 at the front of said table. The tags 43 to be fed are stacked in a receptacle formed by angle irons 8 with the eyes of each alternate tag arranged at opposite sides of said receptacle as indicated, and feed screw 27 operates to constantly press said tags toward the discharge end of said receptacle. Bar 17 is caused to constantly reciprocate across the discharge end of said receptacle with result that the corresponding tag 18 moves over the corresponding end of the last tag in said receptacle and enters the eye 43′ of said tag on its next outward movement. This serves to partially withdraw that tag from said receptacle and leave its eye exposed. On the return movement of bar 17 the other dog engages the eye of the next tag and partially withdraws that tag from the receptacle. By this arrangement it will be observed that each time one of the dogs enters the corresponding eye of one of the tags, the blank end of the next adjacent tag lies behind said eye and thus prevents said dog from engaging more than one tag eye.

Slidably mounted in the guide blocks 6—6 are wire delivery slides 44 each provided with a wire passage therethrough and a wire guide tube 45 registering with said passage and projecting slightly from the rear end of said slide in registration with the eye of a tag partially withdrawn from the feed receptacle on the corresponding side. A wire 46 is passed over a guide wheel 47 secured to the rear of the corresponding block 6 and wound upon a spool 48 adjustably secured to an upper frame extension at the rear, the front end of said wire being passed through the passage and guide tube in the corresponding delivery slide. Each of the slides 44 is provided with a clamping lever 49 pivoted therein and arranged to engage wire 46 as shown. A bar 50 is slidably mounted and given a slot and pin connection with the block adjacent the outer end of lever 49 and adapted to cause said lever to engage said wire by pressing against the end of the lever. Bar 50 is connected by means of a link 51 with an oscillatory lever 52 having a longitudinal slot 53 therein. Slot 53 slidably engages a crank pin 54 mounted upon a block 55 which is adjustably secured in a T-slot 56 in the face of a face plate 57 as shown. Face plate 57 is carried by a stud shaft 58 mounted in a suitable bracket 59 which is adjustably secured to the front of table 1 by means of bolts 60 taking into suitably spaced threaded holes provided in said table. Shaft 58 carries a gear 61 meshing with an idler gear 62 which in turn meshes with a gear 63 adjustably mounted on shaft 26. By this arrangement, it will be observed, that upon rotation of shaft 26 the delivery slides 44 will be caused to reciprocate and that the length of such reciprocation may be adjusted as desired by adjusting blocks 55 in face plate 57. The face plates 57 and blocks 55 are so arranged as to cause the slides 44 to reciprocate alternately, that is when the block on one side is moving rearwardly of table 1 the block on the other side is moving forwardly and vice versa. Slides 44 are frictionally held in their corresponding guide blocks so that the first effect of the rearward movement of the bars 50 is to cause the corresponding lever 49 to clamp or clutch the wire 46 in the corresponding slide with the result that the following movement of the corresponding slide 44 carries the wire 46 with it, but forward movement of bar 50 relieves the pressure from said wire and permits the same to remain in this advanced position.

A pair of wire receiving slides 64 are mounted in blocks 5—5 in longitudinal alinement with blocks 44 and arranged to coöperate therewith to continue the feed of the wire 46. Projecting from the forward end of each of the blocks 64 is a pair of pivoted clamping jaws 65 carrying inter-meshing mutilated gears 66 and normally held apart by means of a spring 67 as shown in Fig. 8. An operating lever 68 is pivoted in each of the blocks 64 in operative relation with one of the jaws 64 so as to be capable of causing the closing or clamping together of said jaws, it being understood that owing to the gear connection between said jaws that movement of one jaw will cause corresponding movement of the other. Lever 68 is connected by means of a link 69 with another lever 70 engaging a slot in a slidable bar 71 having a slot and pin connection with the corresponding block 64. By this arrangement it will be observed that the first effect of rearward movement of bar 71 is to cause clamping jaws 65 to be forced together into clamping position. Each of the bars 71 is connected by means of a link 72 with an oscillatory lever 73 having a longitudinal slot 74 engaging a crank pin 75 mounted in a block 76 adjustably mounted in a T-slot 77 in a face plate 78 carried by a stud shaft 79 mounted in a bracket 80 adjustably secured to the rear of table 1 by means of bolts 81. Shaft 79 carries a gear 82 meshing with a gear 83 in turn meshing with a gear 84 on a shaft 85 mounted at the rear of table 1. One of the shafts 85 has a bevel gear connection 86 with shaft 41 and the other has a bevel gear connection 87 with a shaft 88 mounted at the side of table 1 and having a bevel gear connection 89 with shaft 26. One of the shafts 85 carries a power pulley 90 by means of which the machine is driven. The oscillatory lever 73 and its operative connections are identical in construction and compares with the levers 52 and need no further description beyond the statement that the parts are so arranged as to cause the delivery and receiving slides to operate synchronously, that is the alining slides approach each other simultaneously on one side and recede from each other simultaneously on the other. By this arrangement it will be observed that with the wires 46 projecting slightly from the guide tubes 45, the ends of said wires will be threaded through the eyes of the corresponding partially withdrawn tags and that the corresponding clamping jaws 65 will engage the threaded end of said wires and continue the feed thereof, thus providing a suitable length of wire on each side of the tag.

A wire cutting block 91 is pivoted in a support 92 secured to the rearward end of each of the blocks 44 and normally held in elevated position by a spring 93. Each of the blocks 91 carries gear teeth 94 meshing with a corresponding gear tooth 95 formed on the bottom of the corresponding wire guide tube 45 which is slidably mounted in blocks 44 and normally held in extended position by means of a spring 96. Coöperating with block 91 is a cutting member 97 carried by the end of a lever 98 and provided with a cam block 99 arranged to contact with the rearward edge of tube 45 to press said tube into its corresponding slide and thus cause the elevation of the corresponding block 91 to meet said cutting member. Lever 98 is pivoted in a support 100 and carries at its rearward end a roller 101 operating on a cam 102 adjustably mounted on the corresponding shaft 26, a spring 103 serving to hold said lever normally in contact with said cam. By this arrangement it will be observed that upon rotation of shaft 26 cutting member 97 will be depressed to cause elevation of cutting block 91 and thus severance of the wire 46. The parts are so arranged as to perform this operation quickly at the time of the reversal of the corresponding slide 44 at the forward limit of its movement, that is when a full length of wire 46 has been exposed. It will be observed that when cutting member 97 is withdrawn, tube 45 will operate to cause depression of block 91 thus leaving the corresponding end of wire 46 projecting freely for threading through the eye in the corresponding tag as explained above.

Bifurcated fingers 104 are pivoted to the upper ends of vertically slidable bars 105 projecting upwardly through slots 104′ in the bottom of table 1 and guided by brackets 105′ adjustably secured to the bottom of table 1. Each of the fingers 104 is held in normal position on the corresponding bar 105 by means of springs 106 as indicated in Fig. 6, and the parts are so arranged that said fingers will embrace the withdrawn ends of the tags which have been partially withdrawn from the feed receptacle as explained above. Each of the bars 105 is connected by a link 107 with an eccentric 108 adjustably mounted on a shaft 109 secured across the lower portion of the frame of the machine and having a bevel gear connection 110 with a vertical shaft 111 secured at one side of the frame of the machine and having a bevel gear connection 112 with the shaft 88 as shown in Fig. 5. Eccentrics 108 are so set as to cause elevation of fingers 104 immediately after the severing of the corresponding wire as explained above. Bars 113 are slidably mounted on the top of table 1 in position to contact with the lower end of the corresponding fingers and cause outward movement thereof upon inward movement of said bars. These bars 113 are made adjustable in length so as to permit of lateral adjustment of fingers 104. Bars 113 are held in normal outward position by means of springs 114 and carry rollers 115 in contact with cams 116 on shafts 41 and 88 as shown in Fig. 5. Cams 116 are so set as to cause inward movement of bars 113 immediately after the upward movement of fingers 104, thus causing outward movement of the upper end of said fingers and engagement with the corresponding wire 46 on opposite sides of the corresponding tags and outward bending of the ends of said wire toward each other.

Twisting jaws 117 are mounted on the ends of shafts 118 in position to receive the ends of the severed wires when bent outwardly by the corresponding fingers 104 as explained above. Each of the shafts 118 is made adjustable in length so as to permit of lateral adjustment of fingers 104. Each of the shafts 118 carries at its outer end a pinion 119 meshing with a large gear 120 and shown in Fig. 2. An oscillatory lever 121 carrying a pawl 122 coöperating with gear 120 is connected by means of a link 123 with a crank pin 124 secured to face plate 125 mounted on the corresponding end of shaft 26. By this arrangement it will be observed that upon rotation of shaft 26 shaft 118 will be rotated to cause twisting of the ends of the wires placed therein as explained above. The parts are so arranged as to cause operative rotation of each of the shafts 118 immediately after the corresponding wire has been placed therein and idleness of said shafts during insertions of said wires.

Mounted above the withdrawn ends of the tags at each side of the feed receptacle is a vertically reciprocating bar 126 carrying at its lower end a pivoted clamping jaw 127 normally held in closed position by means of a spring 128. Each of the bars 126 is connected by means of a link 129 with an eccentric 130 adjustably mounted on a shaft 131 secured in the upper frame extension. At one end shaft 131 carries a gear 132 meshing with an idler 133 which in turn meshes with a gear 134 carried by a stud shaft 135 having a bevel gear connection 136 with a vertical shaft 137 and which in turn has a bevel gear connection 138 with shaft 41 as indicated in Fig. 3. By this arrangement it will be observed that the machine will be connected to shaft 131 to cause vertical reciprocation of bars 126. The parts are so arranged as to cause this reciprocation of said bars immediately after the wire has been threaded and twisted through the eye of the corresponding withdrawn tag. Each of the jaws 127 carries a pivoted trigger 139 held from upward swinging by means of a stop 140 and yieldingly pressed to position against said stop by means of a spring 140'. Located beneath trigger 139 is a trip bar 141 arranged to engage the outer end of trigger arm 139 during the downward movement of bar 126 and causes outward swinging of jaw 127 to permit engagement of said jaw with a corresponding end of a withdrawn tag. Continued downward movement of bar 126 causes trigger 139 to ride off of bar 141 thus permitting closing of the corresponding jaw 127 under the influence of spring 128 and engagement or grasping of the corresponding withdrawn tag end. Upon elevation of bar 126 trigger 139 snaps over bar 141 owing to the action of spring 140'. Reciprocatorily mounted over the feed receptacle is a discharge receptacle 142 having an adjustable top 143 rendered adjustable by means of screws taking through slots 144 in the upper sides of said discharge receptacle. The top and bottom of receptacle 142 are longitudinally slotted to permit the passage of bars 126 and reciprocations of said discharge receptacle. Receptacle 142 is connected by means of a link 145 with a crank pin 146 secured to a face plate 147 carried by a shaft 148 which has a bevel gear connection 149 with a shaft 150 having a bevel gear connection 152 with shaft 41 as indicated in Fig. 3. By this arrangement it will be observed that discharge receptacle 142 may be adjusted to frictionally receive the wired tags and hold the same in vertical positions and that said receptacle 142 would be reciprocated longitudinally at the time of the reciprocations of bar 126. The parts are so arranged as to cause the reciprocation of receptacle 142 during the upward movement of bar 126 and immediately after the tag held by the jaw 127 has encountered the top of said receptacle. Further movement of bar 126 will cause the tag to be stripped from the jaw 127 and at the same time the continued movement of receptacle 142 will cause said tag to enter said receptacle, so that by the time said tag is entirely stripped or freed from jaw 127, the tag will be frictionally held in receptacle 142 in a vertical position. Thus as each additional tag is fixed into said discharge receptacle the preceding tags will be forced toward the front or discharge end and will be discharged therefrom as each additional tag is added at the rear as will be readily understood.

It will be observed that the machine thus provided is of simple construction and efficient in operation and may be readily adjusted to use on tags of different sizes.

While I have illustrated and described the preferred construction for carrying my invention into effect, this is capable of variations or modifications without departing from the spirit of the invention. I, therefore, do not wish to be limited to the exact details of construction set forth but desire to avail myself of such variations and modifications as come within the scope of the appended claims.

Having described my invention what I claim as new and desire to secure by Letters Patent is:

1. In a tag machine, the combination of a frame; a tag receptacle on said frame having a discharge opening at one side of one end thereof; means for pressing tags toward the discharge end of said receptacle; means of engaging the eye of the tag at the discharge end of said receptacle and partially withdrawing said tag from said receptacle; and means for fastening securing means through the eye of the tags while in partially withdrawn position, substantially as described.

2. In a tag machine, the combination of a frame; a tag receptacle on said frame having a discharge opening at one side of one end thereof; means for pressing tags toward the discharge end of said tag receptacle; a reciprocatory member carrying a spring held dog adapted to engage the eye of the tag at the discharge end of said receptacle and partially withdraw said tag from said receptacle; and means for fastening securing means through the eye of the tags while in partially withdrawn position, substantially as described.

3. In a tag machine, the combination of a frame; a tag receptacle on said frame having a discharge opening at one side of one end thereof; means for pressing tags toward the discharge end of said receptacle; means for engaging the eye of the tag at the discharge end of said receptacle and partially withdrawing said tag from said receptacle; a reciprocatory delivery slide carrying a wire guide registering with the eye of a withdrawn tag; wire clutch mechanism in said slide and adapted to engage a wire in said guide and cause the end of a wire clutched therein to pass through the eye of a withdrawn tag; a reciprocatory receiving slide carrying a wire clutch registering with the eye of a withdrawn tag and adapted to engage a wire end passed through said eye; reciprocating means arranged to operate said receiving slide and clutch synchronously with said delivery slide; means for severing a wire drawn through a tag eye; and means for twisting the ends of said wire together, substantially as described.

4. In a tag machine, the combination of a frame; a tag receptacle on said frame having a discharge opening at one side of one end thereof; means for pressing tags toward the discharge end of said receptacle; a reciprocatory member carrying a spring held dog adapted to engage the eye of the tag at the discharge end of said receptacle and partially withdraw said tag from said receptacle; a reciprocatory delivery slide carrying a wire guide registering with the eye of a withdrawn tag; wire clutch mechanism in said slide and adapted to engage a wire in said guide and cause the end of a wire clutched therein to pass through the eye of a withdrawn tag; reciprocating means arranged to operate said clutch and slide; a reciprocatory receiving slide carrying a wire clutch registering with the eye of a withdrawn tag and adapted to engage a wire end passed through said eye; reciprocating means arranged to operate said receiving slide and clutch synchronously with said delivery slide; means for severing the wire drawn through a tag eye; and means for twisting the ends of said wire together, substantially as described.

5. In a tag machine, the combination of a frame; a tag receptacle on said frame having a discharge opening at one side of one end thereof; means for pressing tags toward the discharge end of said receptacle; means for engaging the eye of the tag at the discharge end of said receptacle and partially withdrawing said tag from said receptacle; a reciprocatory delivery slide carrying a wire guide registering with the eye of a withdrawn tag; wire clutch mechanism in said slide and adapted to engage a wire in said guide and cause the end of a wire clutched therein to pass through the eye of a withdrawn tag; reciprocating means arranged to operate said clutch and slide; a reciprocatory receiving slide carrying a wire clutch registering with the eye of a withdrawn tag and adapted to engage a wire end passed through said eye; reciprocating means arranged to operate said receiving slide and clutch synchronously with said delivery slide; means for severing a wire drawn through a tag eye; a bifurcated finger arranged to embrace a withdrawn tag and move outwardly to bend the ends of a severed wire together; means for operating said finger; a twisting jaw arranged to receive said wire ends; means for rotating said jaw; and means for removing a wired tag, substantially as described.

6. In a tag machine, the combination of a frame; a tag receptacle on said frame having a discharge opening at one side of one end thereof; means for pressing tags toward the discharge end of said receptacle; a reciprocatory member carrying a spring held dog adapted to engage the eye of the tag at the discharge end of said receptacle and partially withdraw said tag from said receptacle; a reciprocatory delivery slide carrying a wire guide registering with the eye of a withdrawn tag; wire clutch mechanism in said slide and adapted to engage a wire in said guide; reciprocating means arranged to operate said guide and slide; a reciprocatory receiving slide carrying a wire clutch registering with the eye of a withdrawn tag; reciprocating means arranged to operate said receiving slide and clutch synchronously with said delivery slide; means for severing a wire drawn through a tag eye; a bifurcated finger arranged to embrace a withdrawn tag and move outwardly to bend the ends of a severed wire together; means for operating said finger; a twisting jaw arranged to receive said wire ends; means for rotating said jaw; and means for removing a wired tag, substantially as described.

7. In a tag machine, the combination of a frame; a tag receptacle on said frame having a discharge opening at one side of one end thereof, means for pressing tags toward the discharge end of said receptacle; means for engaging the eye of the tag at the discharge end of said receptacle and partially withdrawing said tag from said receptacle; a reciprocatory delivery slide carrying a wire guide registering with the eye of a withdrawn tag; wire clutch mechanism in said slide and adapted to engage a wire in said guide; reciprocating means arranged to operate said clutch and slide; a reciprocatory receiving slide carrying a wire clutch registering with the eye of a withdrawn tag and adapted to engage a wire end passed through said eye; reciprocating means arranged to operate said receiving slide and clutch synchronously with said delivery slide; means for severing a wire drawn through a tag eye; a bifurcated finger arranged to embrace a withdrawn tag and move outwardly to bend the ends of a severed wire together; means for operating said finger; a twisting jaw arranged to receive said wire ends; means for rotating said jaw; a vertically reciprocating jaw arranged to grasp a withdrawn tag and move it entirely from said receptacle; and means for removing tags from said jaws, substantially as described.

8. In a tag machine, the combination of a frame; a tag receptacle on said frame having discharge openings at one side of one end thereof; means for pressing tags toward the discharge end of said receptacle; a reciprocatory member carrying a spring held dog adapted to engage the eye of the tag at the discharge end of said receptacle and partially withdraw said tag from said receptacle; a reciprocatory delivery slide carrying a wire guide registering with the eye of a withdrawn tag; wire clutch mechanism in said slide and adapted to engage a wire in said guide; reciprocating means arranged to operate said clutch and slide; a reciprocatory receiving slide carrying a wire clutch registering with the eye of a withdrawn tag; reciprocating means arranged to operate said receiving slide and clutch synchronously with said delivery slide; means for severing a wire drawn through a tag eye; a bifurcated finger arranged to embrace a withdrawn tag and move outwardly to bend the ends of a severed wire together; means for operating said finger; a twisting jaw arranged to receive said wire ends; means for rotating said jaw; a vertically reciprocating jaw arranged to grasp a withdrawn tag and move it entirely from said receptacle; and means for removing tags from said jaws, substantially as described.

9. In a tag machine, the combination of a frame; a tag receptacle on said frame having a discharge opening at one side of one end thereof; means for pressing tags toward the discharge end of said receptacle; means for engaging the eye of a tag at the discharge end of said receptacle and partially withdrawing said tag from said receptacle; a reciprocatory delivery slide carrying a wire guide registering with the eye of a withdrawn tag; wire clutch mechanism in said slide and adapted to engage a wire in said guide; reciprocatory receiving slide carrying a wire clutch registering with the eye of a withdrawn tag; reciprocatory means arranged to operate said receiving slide and clutch mechanism with said delivery slide; means for severing a wire drawn through a tag eye; a bifurcated finger arranged to embrace a withdrawn tag and move outwardly to bend the ends of a severed wire together; means for operating said finger; a twisting jaw arranged to receive said wire ends; means for rotating said jaw; a vertically reciprocating jaw arranged to grasp a withdrawn tag and remove it entirely from said receptacle; and a reciprocating discharge receptacle carrying stripping means at its top and arranged to withdraw tags from said jaw, substantially as described.

10. In a tag machine, the combination of a frame; a tag receptacle on said frame having a discharge opening at one side of one end thereof; means for pressing tags toward the discharge end of said receptacle; a reciprocatory member carrying a spring held dog adapted to engage the eye of the tag at the discharge end of said receptacle and partially withdraw said tag from said receptacle; a reciprocatory delivery slide carrying a wire guide registering with the eye of a withdrawn tag; wire clutch mechanism in said slide and adapted to engage a wire in said guide; reciprocating means arranged to operate said clutch and slide; a reciprocatory receiving slide carrying a wire clutch registering with the eye of a withdrawn tag; reciprocating means arranged to operate said receiving slide and clutch mechanism with said delivery slide; means for severing a wire drawn through a tag eye; a bifurcated finger arranged to embrace a withdrawn tag and move outwardly to bend the ends of a severed wire together; means for operating said finger; a twisting jaw arranged to receive said wire ends; means for rotating said jaw; a vertically reciprocating jaw arranged to grasp a withdrawn tag and move it entirely from said receptacle; and a reciprocating discharge receptacle carrying stripping means at its top arranged to withdraw tags from said jaws, substantially as described.

11. In a tag wiring machine, the combination of a frame; a tag receptacle on said frame having discharge openings at each side of one end thereof; tags arranged in said receptacle with the eyes in alternate tags at opposite sides thereof; means for pressing tags toward the discharge end of said receptacle; means for engaging the eye of the tag at the discharge end of said receptacle and partially withdrawing said tag alternately from said discharge openings;

and means for fastening securing means through the eyes of the withdrawn tags, substantially as described.

12. In a tag wiring machine, the combination of a frame; a tag receptacle on said frame having discharge openings at each side of one end thereof; means for pressing tags toward the discharge end of said receptacle; a reciprocatory member carrying spring held dogs adapted to engage the eyes of tags at the discharge end of said receptacle and partially withdraw said tag from said discharge openings alternately; and means for fastening securing means through the eyes of the withdrawn tags, substantially as described.

13. In a tag wiring machine, the combination of a frame; a tag receptacle on said frame having discharge openings at each side of one end thereof; means for pressing tags toward the discharge end of said receptacle; means for engaging the eyes of the tags at the discharge end of said receptacle and partially withdrawing said tags alternately through said discharge openings; a reciprocatory delivery slide carrying a wire guide registering with the eye of a withdrawn tag at each side of said receptacle; wire clutch mechanism in each of said slides and adapted to engage a wire in the corresponding guide and cause the end of a wire clutched therein to pass through the eye of a withdrawn tag; reciprocating means arranged to operate each clutch and slide; a reciprocating receiving slide arranged at each side of said receptacle and carrying a wire clutch registering with the eye of the corresponding withdrawn tag and adapted to engage a wire end passed through said eye; reciprocating means arranged to operate said receiving slides and clutches synchronously with said delivery slides; means for severing a wire drawn through a tag eye; and means for twisting the ends of said wire together, substantially as described.

14. In a tag wiring machine, the combination of a frame; a tag receptacle on said frame having discharge openings at each side of one end thereof; means for pressing tags toward the discharge end of said receptacle; a reciprocatory member carrying spring held dogs adapted to engage the eyes of tags at the discharge end of said receptacle and partially withdraw said tags from said discharge openings alternately; a reciprocatory delivery slide carrying a wire guide registering with the eye of a withdrawn tag at each side of said receptacle; wire clutch mechanism in each of said slides and adapted to engage a wire in the corresponding guide and cause the end of a wire clutched therein to pass through the eye of a withdrawn tag; reciprocating means arranged to operate each clutch and slide; a reciprocatory receiving slide arranged at each side of said receptacle and carrying a wire clutch registering with the eye of the corresponding tag and adapted to engage a wire end passed through said eye; reciprocating means arranged to operate said receiving slides and clutches synchronously with said delivery slides; means for severing a wire drawn through a tag eye; and means for twisting the sides of said wire together, substantially as described.

15. In a tag wiring machine, the combination of a frame; a tag receptacle on said frame having discharge openings at each side of one end thereof; means for pressing tags toward the discharge end of said receptacle; means for engaging the eyes of the tags at the discharge end of said receptacle and partially withdrawing said tags alternately through said openings; a reciprocatory delivery slide carrying a wire guide registering with the eye of a withdrawn tag at each side of said receptacle; wire clutch mechanism in each of said slides and adapted to engage a wire in the corresponding guide; reciprocating means arranged to operate each clutch and slide; a reciprocatory receiving slide arranged at each side of said receptacle and carrying a wire clutch registering with the eye of the corresponding tag; reciprocating means arranged to operate said receiving slides and clutches synchronously with said delivery slides; means for severing a wire drawn through a tag eye; a bifurcated finger arranged to embrace each withdrawn tag and move outwardly to bend the ends of a severed wire together; means for operating said finger; a twisting jaw arranged to receive each set of wire ends; means for rotating said twisting jaws; and means for removing the wired tags, substantially as described.

16. In a tag wiring machine, the combination of a frame; a tag receptacle on said frame having discharge openings at each side of one end thereof; means for pressing tags toward the discharge end of said receptacle; a reciprocatory member carrying spring held dogs adapted to engage the eyes of the tags at the discharge end of said receptacle and partially withdraw said tags from said discharge openings alternately; a reciprocatory delivery slide carrying wire guides registering with the eye of a withdrawn tag at each side of said receptacle; a wire clutch mechanism in each of said slides and adapted to engage a wire in the corresponding guides and cause the end of a wire clutched therein to pass through the eye of a withdrawn tag; reciprocating means arranged to operate each clutch and slides; a reciprocatory receiving slide arranged at each side of said receptacle and carrying a wire clutch registering with the eye of the corresponding tag and adapted to engage a wire end passed through said eye; reciprocating means arranged to operate said receiving slides and clutches synchronously with said delivery slides; means for severing a wire drawn through a tag eye; a bifurcated finger arranged to embrace each withdrawn tag and move outwardly to bend the ends of a severed wire together; means for operating said finger; a twisting jaw arranged to receive each set of wire ends; means for rotating said twisting jaw; and means for removing the wired tags, substantially as described.

17. In a tag wiring machine, the combination of a frame; a tag receptacle in said frame having discharge openings at each side of one end thereof; means for pressing tags toward the discharge end of said receptacle; means for engaging the eyes of the tags at the discharge end of said receptacle and partially withdrawing said tags alternately through said discharge openings; a reciprocatory delivery slide carrying a wire guide registering with the eye of a withdrawn tag at each side of said receptacle; a wire clutch mechanism in each of said slides and adapted to engage a wire in the corresponding guide; reciprocating means arranged to operate each clutch and slide; a reciprocatory receiving slide arranged at each side of said receptacle and carrying a wire clutch registering with the eye of the corresponding tag; reciprocating means arranged to operate said receiving slides and clutches synchronously with said delivery slides; means for severing wire drawn through a tag eye; a bifurcated finger arranged to embrace each withdrawn tag and moved outwardly to bend the ends of a wire together; means for operating said finger; a twisting jaw arranged to receive each set of wire ends; means for rotating the twisting jaws; a vertically reciprocating jaw arranged to grasp each withdrawn tag and remove it entirely from said receptacle; and means for removing tags from said jaws, substantially as described.

18. In a tag wiring machine, the combination of a frame; a tag receptacle on said frame having discharge openings at each side of one end thereof; means for pressing tags toward the discharge end of said receptacle; a reciprocatory member carrying spring held dogs arranged to engage the eyes of the tags at the discharge ends of said receptacle and partially withdraw said tags from said discharge openings alternately; a reciprocatory delivery slide carrying a wire guide registering with the eye of a withdrawn tag at each side of said receptacle; a wire clutch mechanism in each of said slides adapted to engage a wire in the corresponding guides; reciprocating means arranged to operate each clutch and slide; a reciprocatory receiving slide arranged at each side of said receptacle and carrying a wire clutch registering with the eye of the corresponding tag; reciprocating means arranged to operate said receiving slides and clutches synchronously with said delivery slides; means for severing a wire drawn through a tag eye; a bifurcated finger arranged to embrace each withdrawn tag and move outwardly to bend the ends of a severed wire together; means for operating said finger; a twisting jaw arranged to receive each set of wire ends; means for rotating the twisting jaw; a vertically reciprocating jaw arranged to grasp each withdrawn tag and remove it entirely from said receptacle; and means for removing tags from said jaws, substantially as described.

19. In a tag wiring machine, the combination of a frame; a tag receptacle on said frame having discharge openings at each side of one end thereof; means for pressing tags toward the discharge end of said receptacle; means for engaging the eyes of the tags at the discharge end of said receptacle and partially withdrawing said tags alternately through said discharge openings; a reciprocatory delivery slide carrying a wire guide registering with the eye of a withdrawn tag at each side of said receptacle; wire clutch mechanism in each of said slides and adapted to engage a wire in the corresponding guides; reciprocating means arranged to operate each clutch and slide; a reciprocatory receiving slide arranged at each side of said receptacle and carrying a wire clutch registering with the eye of the corresponding tag; reciprocating means arranged to operate said receiving slides and clutches synchronously with said delivery slides; means for severing a wire drawn through a tag eye; a bifurcated finger arranged to embrace each withdrawn tag and move outwardly to bend the ends of a severed wire together; means for operating said finger; a twisting jaw rotating the twisting jaws; a vertically reciprocating jaw arranged to grasp each withdrawn tag and remove it entirely from said receptacle; and a reciprocating discharge receptacle carrying stripping means at its top arranged to withdraw tags from said jaws, substantially as described.

20. In a tag wiring machine, the combination of a frame; a tag receptacle on said frame having discharge openings at each side of one end thereof; means for pressing tags toward the discharge end of said receptacle; a reciprocatory member carrying spring held dogs adapted to engage the eyes of tags at the discharge end of said receptacle and partially withdraw said tags from said discharge openings alternately; a reciprocatory delivery slide carrying a wire guide registering with the eye of a withdrawn tag at each side of said receptacle; wire clutch mechanism in each of said slides and adapted to engage a wire in the corresponding guide; reciprocating means arranged to operate each clutch and slide; a reciprocatory receiving slide arranged at each side of said receptacle and carrying a wire clutch registering with the eye of the corresponding tag; reciprocating means arranged to operate said receiving slots and clutches synchronously with said delivery slides; means for severing a wire drawn through a tag eye; a bifurcated finger arranged to embrace each withdrawn tag and move outwardly to bend the end of a severed wire together; means for operating said finger; a twisting jaw arranged to receive each set of wire ends; means for rotating the twisting jaws; a vertically reciprocating jaw arranged to grasp each withdrawn tag and remove it entirely from said receptacle; and a reciprocating discharge receptacle carrying stripping means at its top arranged to withdraw tags from said jaws, substantially as described.

21. In a tag wiring machine, the combination of a frame; a tag receptacle on said frame having discharge openings at each side of one end thereof; said receptacle being adjustable in width and depth; tags arranged in said receptacle with the eyes in alternate tags at opposite sides thereof; means for pressing tags toward the discharge ends of said receptacle; means for engaging the eyes of the tags at the discharge end of said receptacle and partially withdrawing said tags alternately through said discharge openings; and means for fastening securing means through the eyes of the withdrawn tags, substantially as described.

22. In a tag wiring machine, the combination of a frame; a tag receptacle on said frame having discharge openings at each side of one end thereof; said receptacle being adjustable in width and depth; tags arranged in said receptacle with the eyes in alternate tags at opposite sides thereof; means for pressing tags toward the discharge end of said receptacle; a reciprocatory member carrying spring held dogs adapted to engage the eyes of tags at the discharge end of said receptacle and partially withdraw said tags from said discharge openings alternately; and means for fastening securing means through the eyes of the withdrawn tags, substantially as described.

23. In a tag wiring machine, the combination of a frame; a tag receptacle on said frame having discharge openings at each side of one end thereof, said receptacle being adjustable in width and depth; means for pressing tags toward the discharge end of said receptacle; means for engaging the eyes of the tags at the discharge end of said receptacle and partially withdrawing said tag alternately through said discharge openings; a laterally adjustable reciprocatory delivery slide carrying a wire guide registering with the eye of a withdrawn tag at each side of said receptacle; wire clutch mechanism in each of said slides and adapted to engage a wire in the corresponding guide; laterally adjustable reciprocating means arranged to operate each clutch and slide; a laterally adjustable reciprocatory receiving slide arranged at each side of said receptacle and carrying a wire clutch registering with the eye of the corresponding withdrawn tag; laterally adjustable, reciprocating means arranged to operate said receiving slides and clutches synchronously with said delivery slides; laterally adjustable means for severing a wire drawn through a tag eye; and means for twisting the sides of said wire together, substantially as described.

24. In a tag wiring machine, the combination of a frame; a tag receptacle on said frame having discharge openings at each side of one end thereof; said receptacle being adjustable in width and depth; means for pressing tags toward the discharge end of said receptacle; a reciprocatory member carrying spring held dogs adapted to engage the eyes of the tags at the discharge end of said receptacle and partially withdraw said tags from said discharge openings alternately; a laterally adjustable reciprocatory delivery slide carrying a wire guide registering with the eye of a withdrawn tag at each side of said receptacle; wire clutch mechanism in each of said slides and adapted to engage a wire in the corresponding guides; laterally adjustable reciprocating means arranged to operate each clutch and slide; a laterally adjustable reciprocatory receiving slide arranged at each side of said receptacle and carrying a wire clutch registering with the eye of the corresponding withdrawn tag; laterally adjustable means for severing a wire drawn through a tag eye; and means for twisting the sides of said wire together, substantially as described.

25. In a tag wiring machine, the combination of a frame; a tag receptacle on said frame having discharge openings at each side of one end thereof; said receptacle being adjustable in width and depth; means for pressing tags toward the discharge end of said receptacle; means for engaging the eye of the tag at the discharge end of said receptacle and partially withdrawing said tag alternately through said discharge openings; a laterally adjustable reciprocatory delivery slide carrying a wire guide registering with the eye of a withdrawn tag at each side of said receptacle; wire clutch mechanism in each of said slides and adapted to engage a wire in the corresponding guides; laterally adjustable receiving means arranged to operate each clutch and slide; a laterally adjustable reciprocatory receiving slide arranged at each side of said receptacle and carrying a wire clutch registering with the eye of the corresponding withdrawn tag; laterally adjustable reciprocating means arranged to operate said receiving slides and clutches synchronously with said delivery slides; laterally adjustable means for severing a wire drawn through a tag eye; a laterally adjustable bifurcated finger arranged to embrace each withdrawn tag and move outwardly to bend the ends of a severed wire together; laterally adjustable means for operating said fingers; a laterally adjustable twisting jaw arranged to receive each set of wire ends; means for rotating the twisting jaws; and means for removing the wired tags, substantially as described.

26. In a tag wiring machine, the combination of a frame; a tag receptacle on said frame having discharge openings at each side of one end thereof; said receptacle being adjustable in width and depth; means for pressing tags toward the discharge end of said receptacle; a reciprocatory member carrying spring held dogs adapted to engage the ends of tags at the discharge end of said receptacle and partially withdraw said tags from said discharge openings alternately; a laterally adjustable reciprocatory delivery slide carrying a wire guide registering with the eye of a withdrawn tag at each side of said receptacle; wire clutch mechanism in each of said slides and adapted to engage a wire in the corresponding guides; laterally adjustable reciprocating means arranged to operate each clutch and slide; a laterally adjustable reciprocatory receiving slide arranged at each side of said receptacle and carrying a wire clutch registering with the eye of the corresponding withdrawn tag; laterally adjustable reciprocating means arranged to operate said receiving slides and clutches synchronously with said delivery slides; laterally adjustable means for severing a wire drawn through a tag eye; a laterally adjustable bifurcated finger arranged to embrace each withdrawn tag and move outwardly to bend the ends of a severed wire together; laterally adjustable means for operating said fingers; a laterally adjustable twisting jaw arranged to receive each set of wire ends; means for rotating the twisting jaws; and means for removing the wired tags, substantially as described.

27. In a tag wiring machine, the combination of a frame; a tag receptacle on said frame having discharge openings at each side of one end thereof; said receptacle being adjustable in width and depth; means for pressing tags toward the discharge end of said receptacle; means for engaging the eyes of the tags at the discharge end of said receptacle and partially withdrawing said tags alternately through said discharge openings; a laterally adjustable reciprocatory delivery slide carrying a wire guide registering with the eye of a withdrawn tag at each side of said receptacle; wire clutch mechanism in each of said slides and adapted to engage a wire in the corresponding guides; laterally adjustable reciprocating means arranged to operate each clutch and slide; a laterally adjustable reciprocatory receiving slide arranged at each side of said receptacle and carrying a wire clutch registering with the eye of the corresponding withdrawn tag; laterally adjustable reciprocating means arranged to operate said receiving slides and clutches synchronously with said delivery slides; laterally adjustable means for severing a wire drawn through a tag eye; a laterally adjustable bifurcated finger arranged to embrace each withdrawn tag and move outwardly to bend the ends of a severed wire together; laterally adjustable means for operating said fingers; a laterally adjustable twisting jaw arranged to receive each set of wire ends; means for rotating the twisting jaws; a vertically reciprocating jaw arranged to grasp each withdrawn tag and remove it entirely from said receptacle; and means for removing tags from said jaws, substantially as described.

28. In a tag wiring machine, the combination of a frame; a tag receptacle on said frame having discharge openings at each side of one end thereof, said receptacle being adjustable in width and depth; means for pressing tags toward the discharge end of said receptacle; a reciprocatory member carrying spring held dogs adapted to engage the eyes of the tags at the discharge end of said receptacle and partially withdraw said tags from said discharge openings alternately; a laterally adjustable reciprocatory delivery slide carrying a wire guide registering with the eye of a withdrawn tag at each side of said receptacle; wire clutch mechanism in each of said slides and adapted to engage a wire in a corresponding guide; laterally adjustable reciprocating means arranged to operate each clutch and slide; a laterally adjustable reciprocatory receiving slide arranged at each side of said receptacle and carrying a wire clutch registering with the eye of the corresponding withdrawn tag; laterally adjustable receiving means arranged to operate said receiving slides and clutches synchronously with said delivery slides; laterally adjustable means for severing a wire drawn through a tag eye; a laterally adjustable bifurcated finger arranged to embrace each withdrawn tag and move outwardly to bend the ends of a severed wire together; laterally adjustable means for operating said fingers; a laterally adjustable twisting jaw arranged to receive each set of wire ends; means for rotating the twisting jaws; a vertically reciprocating jaw arranged to grasp each withdrawn tag and remove it entirely from said receptacle; and means for removing tags from said jaws, substantially as described.

29. In a tag wiring machine, the combination of a frame; a tag receptacle on said frame having discharge openings at each side of one end thereof; said receptacle being adjustable in width and depth; means for pressing tags toward the discharge end of said receptacle; means for engaging the eyes of the tags at the discharge end of said receptacle and partially withdrawing said tags alternately through said discharge openings; a laterally adjustable reciprocatory delivery slide carrying a wire guide registering with the eye of a withdrawn tag at each side of said receptacle; wire clutch mechanism in each of said slides and adapted to engage a wire in the corresponding guides; laterally adjustable reciprocating means arranged to operate each clutch and slide; a laterally adjustable reciprocatory receiving slide arranged to each side of said receptacle and carrying a wire clutch registering with the eye of the corresponding withdrawn tag; laterally adjustable reciprocating means arranged to operate said receiving slides and clutches synchronously with said delivery slides; laterally adjustable means for severing a wire drawn through a tag eye; a laterally adjustable bifurcated finger arranged to embrace each withdrawn tag and move outwardly to bend the ends of a severed wire together; laterally adjustable means for operating said fingers; a laterally adjustable twisting jaw arranged to receive each set of wire ends; means for rotating the twisting jaws; a vertically reciprocating jaw arranged to grasp each withdrawn tag and remove it entirely from said receptacle; and a reciprocating discharge receptacle carrying stripping means at its top arranged to withdraw tags from said jaws, substantially as described.

30. In a tag wiring machine, the combination of a frame; a tag receptacle on said frame having discharge openings at each side of one end thereof; said receptacle being adjustable in width and depth; means for pressing tags toward the discharge end of said receptacle; a reciprocatory member carrying spring held dogs adapted to engage the eyes of the tags at the discharge end of said receptacle and partially withdraw said tags from said discharge openings alternately; a laterally adjustable reciprocatory delivery slide carrying a wire guide registering with the eye of a withdrawn tag at each side of said receptacle; wire clutch mechanism in each of said slides and adapted to engage a wire in a corresponding guide; laterally adjustable reciprocating means arranged to operate each clutch and slide; a laterally adjustable reciprocatory receiving slide arranged at each side of said receptacle and carrying a wire clutch registering with the eye of the corresponding withdrawn tag; laterally adjustable receiving means arranged to operate said receiving slides and clutches synchronously with said delivery slides; laterally adjustable means for severing a wire drawn through a tag eye; a laterally adjustable bifurcated finger arranged to embrace each withdrawn tag and move outwardly to bend the ends of a severed wire together; laterally adjustable means for operating said fingers; a laterally adjustable twisting jaw arranged to receive each set of wire ends; means for rotating the twisting jaws; a vertically reciprocating jaw arranged to grasp each withdrawn tag and remove it entirely from said receptacle; and a reciprocatory discharge receptacle carrying stripping means at its top arranged to withdraw tags from said jaws, substantially as described.

In testimony whereof I have signed my name to this specification in the presence of two subscribing witnesses.

JOHN W. HOWE.

Witnesses:
HELEN F. LILLIS,
JOSHUA R. H. POTTS.

Copies of this patent may be obtained for five cents each, by addressing the "Commissioner of Patents, Washington, D. C."